(No Model.)
A. ZEMPLINER.
CANOPY FOR COUNTERWEIGHT DROP LIGHTS.
No. 529,055. Patented Nov. 13, 1894.
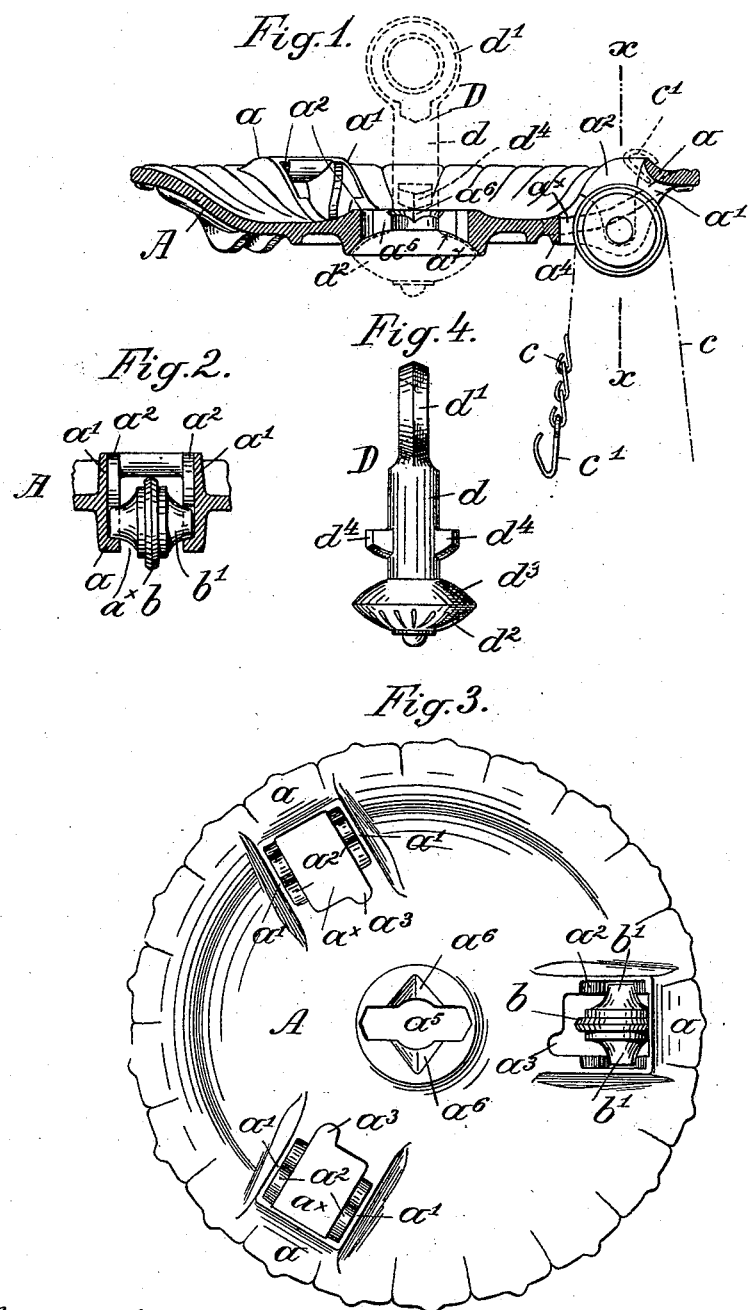
Witnesses
H. G. Dieterich
Henry Orth
Inventor
Alfred Zempliner
per Henry Orth
atty

UNITED STATES PATENT OFFICE.

ALFRED ZEMPLINER, OF VIENNA, AUSTRIA-HUNGARY.

CANOPY FOR COUNTERWEIGHT DROP-LIGHTS.

SPECIFICATION forming part of Letters Patent No. 529,055, dated November 13, 1894.

Application filed July 12, 1894. Serial No. 517,359. (No model.)

*To all whom it may concern:*

Be it known that I, ALFRED ZEMPLINER, general manager of the firm of Brunner & Co., lamp and hardware manufacturers, of Vienna, a subject of the Emperor of Austria-Hungary, residing at Vienna, in the Province of Lower Austria, in the Empire of Austria-Hungary, have invented certain new and useful Improvements in Chain-Carriers (Canopies) for Suspended Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to canopies or carriers for counter-weight drop lights, and, as is well known, the rollers over which the carrier chains are run have been held to their bearings in lugs on the under side of the canopy by upsetting the journal ends, while the suspension rod for the canopy has been secured to the latter by means of nuts, and jam nuts, or forelocks and the like. This construction involves considerable expense and labor, and does not afford sufficient safety, owing to the great number of constituent parts.

My invention has for its object the provision of means whereby the construction of canopies and the connection therewith of their suspension rods is materially simplified, greater durability and safety attained, and the labor of assembling and dismembering the parts minimized.

To these ends the invention consists in the construction of the bearings for the chain rollers and of the suspension rod for the canopy, as will now be fully described, reference being had to the accompanying drawings, in which—

Figure 1 is a transverse section of a canopy for counterweight drop lights, the suspension rod being shown in dotted lines. Fig. 2 is a section taken on or about on line $x-x$ of Fig. 1. Fig. 3 is a top plan view of the canopy, and Fig. 4 is a detached view of the suspension rod.

Similar letters of reference indicate like parts wherever such may occur in the above-described figures of drawings.

The canopy A, which may be of any desired ornamental form, has in its web a central longitudinal slot $a^5$ encompassed on its under side by a concave recess $a^4$ forming a seat for the canopy on the correspondingly convex head $d^3$ of the suspension rod D. The slot $a^5$ is of such length and width as to afford passage to the suspension hook or eye $d'$ on said rod D, and said slot is enlarged midway of its length to afford passage to the cylindrical stem $d$ of the suspension rod. In the upper face of the web of the canopy I form triangular recesses $a^6$ that merge into the enlarged portions of the slot $a^5$ and form seats for correspondingly shaped radial lugs projecting from opposite sides of the suspension rod D for the purpose of preventing said rod, after being passed through the slot and turned, from dropping out again while being handled.

It will be seen that the connection of the rod with the canopy is of the simplest character, and is effected by passing the eye $d'$ and the stem $d$ of the rod D through the slot, and then giving the latter a half turn to cause the radial lugs $d^4$ to register with the slot, and after the lugs have been pushed through said slot the rod is given another half turn to bring the said lugs to their seats $a^6$.

When the canopy is suspended from a ceiling the lugs $d^4$ will of course lie above the web of the canopy, but practically in contact therewith, so that said canopy can be freely revolved on the rod, and is prevented from tilting to one side or the other by the aforesaid lugs $d^4$ straddling the slot $a^5$.

At or near its rim the canopy A is provided with radial slots $a^\times$, the lateral edges of which are formed by vertical walls or cheeks that extend above and below the web of said canopy, and in the proximate faces $a'$ of said cheeks are formed substantially U-shaped recesses $a^2$, the lower ends of which constitute the bearings for the journals $b'$ of the chain rollers $b$. At the forward end of the slots there is an overhanging ledge or bridge $a$ that comes sufficiently close to the roller to allow the suspension chain $c$ to travel freely, and this is also the case with the rear or inner edge of said slot, on one side of which is formed a recess $a^3$.

In assembling the parts, the hook $c'$ that serves to connect one end of the chain $c$ to the counterweight, is first hooked over the inner edge of the overhanging ledge $a$. The roller $b$ is then dropped into its bearings from above, when the said hook $c'$ of chain $c$ is unhooked and then passed through the recess or extended portion $a^3$ of the slot $a^\times$, the chain $c$ being at the same time drawn over the roller $b$. This done, the roller $b$ can not drop out of its bearings unless the chains are removed, even if the canopy were turned upside down.

On the under side of the canopy close to the rear edge of the slots $a^\times$ is formed a recess or groove, whereby a rib $a^4$ is formed along the said rear edge of the slot for the hook $c'$ of chain $c$ to catch on, and thus prevent the chains from running off their rollers before they are secured to the counter-weight and lamp or lamp support, as is the case with canopies as now constructed, yet the chain $c$ may be readily removed by sliding its hook $c'$ off the rib $a^4$ into the recess or extension $a^3$ of the slot $a^\times$.

From what has been said, it will be seen that the construction of canopy and suspension rod is not only materially simplified, but greater durability and safety are attained, while the cost of construction and the labor in assembling the parts are greatly reduced, and the annoyance and loss of time due to the parts becoming detached while being secured in position, is absolutely avoided.

Having thus described my invention, what I claim as new therein, and desire to secure by Letters Patent, is—

1. In counter-weight drop lights, the combination with the canopy provided in its web with a central longitudinal slot, and on the under side of said web with a concave seat encompassing said slot, of a suspension rod adapted to be passed through the slot and provided with a convex bearing fitting the concave seat in the canopy, for the purpose set forth.

2. In counter-weight drop lights, the combination with the canopy provided with a central longitudinal slot and in its under side with a concave seat encompassing said slot, of a suspension rod adapted to be passed through the slot and provided with a convex bearing fitting the concave seat in the canopy, and locking lugs projecting from opposite sides of the rod and adapted to straddle the slot when said rod is passed therethrough and turned, for the purpose set forth.

3. In counter-weight drop lights, a canopy provided with radial slots at or near its rim, the lateral edges of said slots formed by vertical walls or cheeks extending above and below the web of the canopy and having formed therein substantially U-shaped recesses, in combination with chain rollers provided with journals adapted to seat and revolve in the lower end of said U-shaped recesses, for the purpose set forth.

4. In counter-weight drop lights, a canopy provided with radial slots at or near its rim, the lateral edges of said slots formed by vertical walls or cheeks extending above and below the web of the canopy and having formed therein substantially U-shaped recesses, a recess, as $a^3$ in the rear edge of the slots on one side, and a rib, as $a^4$ on the under side of the web extending along said rear edge of the slot to said recess $a^3$, in combination with chain rollers provided with journals adapted to seat and revolve in the lower end of the aforesaid U-shaped recesses, for the purpose set forth.

5. In counter-weight drop lights, a canopy provided with radial slots at or near its rim, the lateral edges of said slots formed by vertical walls or cheeks extending above and below the web of the canopy and having formed therein substantially U-shaped recesses, the bridge, $a$, at the upper end of said recesses, and the recess $a^3$ in the rear edge of the radial slots on one side thereof, in combination with chain rollers provided with journals adapted to seat and revolve in the lower end of the aforesaid U-shaped recesses, for the purpose set forth.

In testimony whereof I affix my signature in presence of two witnesses.

ALFRED ZEMPLINER.

Winesses:
HARRY BELMONT,
JOSEF ZEHETNA.